July 17, 1973  A. G. SZEKELY  3,746,534
METHOD OF TREATING FERROUS METALS WITH OXYGEN CONTAINING
A NON-GASEOUS FLUIDIZED FUEL
Filed March 31, 1964
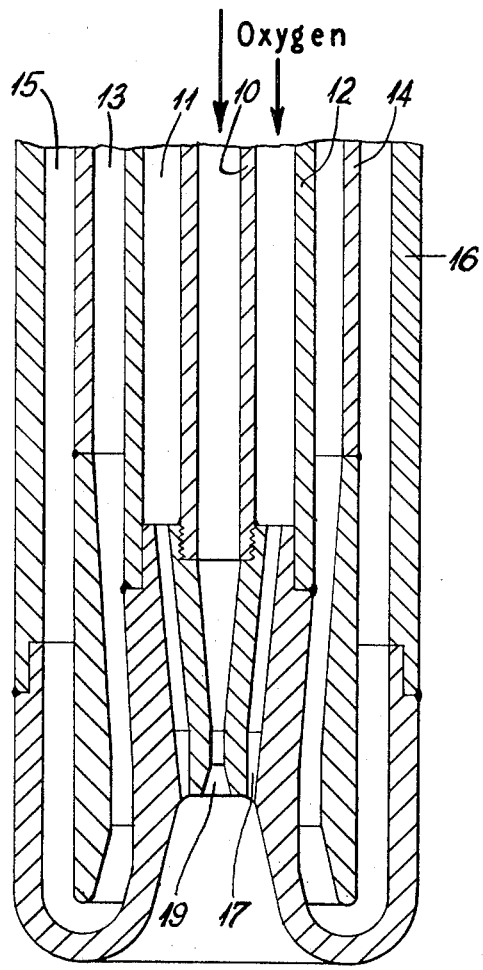
INVENTOR.
ANDREW G. SZEKELY
BY
Leo A. Plum Jr.
ATTORNEY

United States Patent Office 3,746,534
Patented July 17, 1973

3,746,534
METHOD OF TREATING FERROUS METALS WITH OXYGEN CONTAINING A NON-GASEOUS FLUIDIZED FUEL
Andrew G. Szekely, Tonawanda, N.Y., assignor to Union Carbide Corporation
Filed Mar. 31, 1964, Ser. No. 356,172
Int. Cl. C21c 7/00
U.S. Cl. 75—60                                    2 Claims

ABSTRACT OF THE DISCLOSURE

A process for manufacturing steel, including the refining step of top-blowing a molten ferrous charge with at least one oxygen stream, wherein a non-gaseous fluidized fuel is introduced into said oxygen stream continuously throughout the refining step in an amount sufficient to suppress iron oxide fume formation, and said non-gaseous fluidized fuel comprises a solid fuel suspended in a liquid carrier. Said non-gaseous fluidized fuel may also contain a fine dispersion of slag-forming materials for injection into the ferrous metal charge.

---

This invention relates to the treatment of ferrous metal and, more particularly, to the suppression of iron oxide fume which is normally evolved during the refining of molten iron by treatment with oxygen in the course of the manufacture of steel.

The escape of fume to the atmosphere when treating iron with oxygen seriously affects air pollution and contributes to lower ingot yields. In many parts of the country the severity of the fume problem has been so great that communities have threatened the curtailment of operations unless adequate fume control procedures are taken.

It has been produced heretofore to reduce the evolution of iron oxide fume by injecting a combustible gas with the oxygen stream into the molten metal. Examples of suitable gases proposed are free hydrogen, coke oven gas, producer gas, methane, propane, and butane. The disadvantage incurred when utilizing this proposed method to suppress fume is that it requires excessively large volumes of gas which dilutes the oxygen stream being utilized to oxidize impurities in the metal. This in turn requires much larger quantities of oxygen to be used in order to produce a desired drop in carbon level in the bath. It has also been found that when using combustible gases that the reduction in fume evolved is affected considerably by the degree of mixing between the oxygen and the fuel gas, i.e., better results are obtained when the fuel and oxygen are pre-mixed. In many cases, the pre-mixing of combustible gases with oxygen is hazardous and therefore constitutes a safety problem.

It has also been proposed heretofore to reduce the evolution of iron oxide fume by mixing steam or gaseous carbon dioxide with oxygen being blown against the surface of the molten metal. This scheme, however, has the disadvantage that the suppression of the fume is accompanied by a cooling of the metal due to endothermic reactions of the carbon dioxide or steam and also due to the heat absorbed in heating the excess carbon dioxide or steam diluent.

It is therefore an object of the present invention to provide a method of suppressing the formation of iron oxide fume during the treatment of a ferrous metal charge with oxygen which overcomes the above-mentioned disadvantages associated with prior art fume suppression methods.

Another object of the invention is to provide a method of suppressing the formation of iron oxide fume which, in addition, will enable one to transfer additional heat to the charge when needed without interfering with the fume suppression.

Further objects and advantages will be apparent from the following disclosure and claims.

According to one embodiment of the present invention, a method is provided for suppressing the formation of iron oxide fumes which are normally produced when blowing a stream of oxygen against a ferrous metal charge during the refining thereof. The method comprises introducing an additive of non-gaseous fluidized fuel into admixture with the stream of oxygen in an amount between 3 and 12 lbs./1000 s.c.f. (cubic feet at standard temperature and pressure) of oxygen introduced. The oxygen and fluidized fuel are preferably directed against the charge from a metallurgical lance. In accordance with this embodiment, the flows of oxygen and fluidized fuel are initiated with the lance in a high position, considerably above its normal working height for refining. The fluidized fuel is supplied in an amount between 3 and 12 lbs. per 1000 s.c.f. of oxygen introduced. The lance is then lowered into its normal operating position for refining the charge while the flows of oxygen and fluidized fuel are continued in a ratio of 3 to 12 lbs. of fluidized fuel per 1000 s.c.f. of oxygen.

According to another embodiment, the flow of fuel is initiated with the lance in its normal operating position for refining, and after the oxygen flow has been previously turned on. In this case fume evolution will usually have started. An amount of fluidized fuel in excess of 3 to 12 lbs. per 1000 s.c.f. of oxygen is turned on and directed into admixture with the oxygen stream until the evolution of fume is substantially reduced. Thereafter the flow of fluidized fuel is decreased to an amount between 3 and 12 lbs. per 1000 s.c.f. of oxygen to maintain substantially non-fuming conditions during refining.

Still another embodiment contemplates using the metallurgical lance in a high position as a burner to drive heat into the charge. In this instance fluidized fuel in excess of 3 to 12 lbs. per 1000 s.c.f. of oxygen is supplied. Thereafter the refining operation is commenced, while simultaneously suppressing the formation of iron oxide fuming, by adjusting the flow of oxygen to the amount required for refining and then adjusting the fluidized fuel flow to within a range of 3 to 12 lbs. of fuel per 1000 s.c.f. of oxygen, and then lowering the lance into normal working position for refining the charge. During the refining operation the flows of oxygen and fluidized fuel are continued in a ratio of 3 to 12 lbs. of fuel per 1000 s.c.f. of oxygen.

For purposes of this invention, the term "non-gaseous fluidized fuel" may be defined as a liquid fuel or a dispersion of a solid fuel in a liquid carrier. Examples of liquid fuels suitable for use in practicing the present invention are fuel oils, motor oils, kerosene, n-heptane, heavier petroleum distillates and other liquid hydrocarbons. An example of a dispersion of a solid fuel in a liquid carrier suitable for the use in practicing the present invention is coal dust suspended in fuel oil.

The single figure is a longitudinal cross-sectional view of the lower portion of an exemplary metallurgical lance suitable for use in practicing this invention.

Referring to the drawing, a metallurgical lance suitable for use in practicing the invention may consist of an inner tube 10, the forward end of which terminates in a discharge opening 19 at the exposed face of the lance through which a flow of non-gaseous fluidized fuel, e.g. fuel oil, may pass. An outer conduit 12 surrounds inner tube 10, forming an annular passage 11 therebetween through which a flow of oxygen may be passed. It will usually be desirable to construct the lance with outer tubes 14 and 16 to form an annular passage 13 and 15, through which a continuous flow of cooling water may be passed. The process fluids may enter the lance through a manifold (not shown) positioned at the upper end of the lance. At the discharge face of the lance, the fluidized fuel leaving through opening 19 will form a mixture with the oxygen being discharged through a plurality of orifices 17 which communicate with the annular supply passage 11. The mixture is directed toward the ferrous metal charge to be treated with oxygen.

It is generally desirable to initiate the flow of oxygen before the fuel flow is turned on because of safety considerations. If the lance is in its normal working position for refining when the oxygen flow is turned on, however, iron oxide fuming will usually occur. This in turn will generally require an amount of fuel in excess of 3 to 12 lbs. per 1000 s.c.f. of oxygen to stop or substantially reduce the fuming condition. Once the fuming has been stopped or substantially reduced, the fuel flow can be decreased to between 3 and 12 lbs. per 1000 s.c.f. of oxygen.

It has been found that by starting the oxygen flow with the lance in a high position that little or no fuming will be evolved. Then, by intermixing the fluidized fuel with the oxygen before lowering the lance into its normal refining position, fume evolution is substantially prevented from forming. A preferred method of operation according to the present invention therefore consists of initiating the flow of oxygen with the metallurgical lance in a high position, considerably above the normal working height for refining. A non-gaseous fluidized fuel in an amount between 3 and 12 lbs. per 1000 s.c.f. of oxygen flow is then turned on and intermixed with the stream of oxygen. The lance is then lowered into its normal working position for refining the charge while the flows of oxygen and fluidized fuel are contained in a ratio of 3 to 12 lbs. of fluidized fuel per 1000 s.c.f. of oxygen.

In some cases it may be desirable to initially operate the lance as a burner, at time when additional heat input to the charge is needed, e.g., to rapidly form a more fluid slag or to permit an increase in the proportion of cold metallic charge to the vessel. In this case a near-stoichiometric ratio of fuel to oxygen will generally be supplied to the lance. The refining operation may thereafter be commenced while simultaneously suppressing fume evolution, by adjusting the flows of oxygen and fuel to within a range 3 to 12 lbs. of fuel per 1000 s.c.f. oxygen and then lowering the lance into normal working position for refining the charge, while continuing the flows of oxygen and fuel in a ratio of 3 to 12 lbs. of fuel per 1000 s.c.f. of oxygen.

A basic distinguishing feature between the present invention and prior art steelmaking practice is that the injection of non-gaseous fluidized fuel according to the present invention is usually continued throughout the normal refining period, whereas the operation of burners in steelmaking practice is usually confined to the scrap melting and slag forming periods and are not ordinarily operated during the refining period.

The amount of non-gaseous fluidized fuel normally required to almost completely suppress the evolution of iron oxide fuming is between 3 and 12 lbs, per 1000 s.c.f. of oxygen introduced. At these flow rates the fluidized fuel will consume only about one-tenth to one-fifth of the oxygen supplied. The ratio of 3 to 12 lbs. of fluidized fuel per 1000 s.c.f. of oxygen is extremely small in comparison to the ratio of fuel to oxygen usually employed in normal combustion practice, i.e., the ratio is substantially below stoichiometric. This illustrates another distinguishing feature of the present invention over the prior art steelmaking practice using burners.

In order to determine the approximate amount of fluidized fuel required within the range of 3 to 12 lbs. per 1000 s.c.f. of oxygen the following empirical equation may be used:

$$W = \frac{50,000}{Q - (84.4C + 258H)}$$

where

W = The amount of fluidized fuel required, in lbs./1000 s.c.f. of oxygen flow.
Q = Heating value of the fuel, in B.t.u./lb.
C = Carbon content of the fuel, wt. percent.
H = Hydrogen content of the fuel, wt. percent.

It has also been found that the non-gaseous fluidized fuel can be utilized as a carrier stream for injecting slag-forming materials into the ferrous metal charge. The slag-forming ingredients, such as for example, lime, limestone, fluorspar and calcium carbide, should be finely dispersed in the non-gaseous fluidized fuel. Alternatively, it is possible to use the oxygen stream as a carrier for the slag-forming materials, which are then directed into admixture with the fluidized fuel. This practice enables one to almost completely suppress fume formation while simultaneously taking advantage of the heating value of the fuel to produce a hot fluid slag in the early stages of refining.

The invention will be illustrated by the following examples:

EXAMPLE 1

One and one-half tons of molten ferrous metal having an initial temperature of 1504° C. and containing 4.36% C, 0.74% Si and 0.57% Mn was refined with 100 s.c.f.m. of oxygen into which fuel oil was admixed according to the principles of this invention. The oxygen and fuel oil were blown from a lance having a design as shown in the drawing. The oxygen and fuel oil flows were initiated with the discharge end of the lance located 2 feet above the molten metal in a proportion of 10.5 lbs. of oil/1000 s.c.f. of oxygen supplied. After ignition the lance was lowered by 1 foot, and the oil input was reduced to 6.7 lbs./1000 s.c.f. of oxygen. In a later period of refining the lance became submerged in the slag due to the rise of melt level in the converter, and the oil feed rate could be further reduced to 5.0 lbs./1000 s.c.f. of oxygen without the occurrence of any visible dark fume. Decarburization proceeded at a rate of 9 points per minute, and after 27 minutes from start the bath analyzed 0.04% silicone and 0.19% manganese. Hydrogen concentration was below 4 p.p.m.

EXAMPLE 2

Three hundred fifty pounds of ferrous metal having an initial temperature of 1470° C. and containing 4.7% carbon was blown with a mixture of oxygen and kerosene from a concentric lance having a differnt construction than the lance shown in the drawing. The kerosene was injected into the center of an oxygen jet which was discharged at a nominal nozzle velocity of 605 ft./sec. from the lance positioned 1¾ inches above the melt level. The density of fume was 96 grains/cu.ft. without the injection of fuel. At a fuel injection rate of 2.1 lbs./1000 s.c.f of oxygen, the fume density decreased to 0.2 grain/cu. ft. and fume formation was completely suppressed when refining was effectuated with 3.5 lbs. of kerosene per 1000 s.c.f. of oxygen.

EXAMPLE 3

Three hundred fity pounds of molten ferrous metal at an initial temperature of 1420° C. and containing 3.7% C was blown with a mixture of oxygen and S.A.E. 20 W motor oil. The discharge end of the lance was positioned 2 inches above the melt level and had a design similar to that shown in the drawing. The density of fume decreased from 96 grains/cu. ft. to 39 grains/cu. ft. when 4.9 cu. lbs. of motor oil was injected per 1000 s.c.f. of oxygen supplied. Fuming was completely eliminated with a motor oil injection rate of 6.7 lbs./1000 s.c.f. oxygen supplied.

EXAMPLE 4

Three hundred fifty pounds of ferrous metal containing 4.0% C was treated with a mixture of oxygen and n-heptane at conditions described in Example 3. Refining was carried out without any visible formation of fumes by injetcing 5.9 lbs. n-heptane per 1000 s.c.f. of oxygen supplied.

EXAMPLE 5

Three hundred fifty pounds of ferrous metal having an initial temperature of 1440° C. and containing 4.4% C was treated with a mixture of oxygen and benzene at conditions described in Example 3. It was necessary to inject 11.0 lbs. of benzene per 1000 s.c.f. of oxygen supplied in order to completely suppress fuming.

EXAMPLE 6

Three hundred fifty pounds of ferrous metal containing 3.8% C was treated with a mixture of oxygen and a fluidized solid fuel. The fluidized solid fuel was comprised of a 100–200 mesh fraction coal dust, dispersed in fuel oil in a concentration of 10.3 wt. percent. Oxygen was blown in admixture with the fluidized fuel at a rate of 3.2 s.c.f.m. from a nozzle positioned 3¾ inches above the metallic charge. The amount of additive was adjusted to 6.3 lbs. fuel per 1000 s.c.f. of oxygen supplied. At these conditions refining was carried out without any visible formation of fumes.

Having described the invention in detail, it will be apparent to those skilled in the art that certain modifications may be made within the spirit and scope of the invention. For example, the intermixing of oxygen and non-gaseous fluidized fuel may be accomplished with metallurgical lances other than the type shown in the drawing. The method of the invention may be carried out in any suitable vessel. Examples of such vessels include open hearth furnaces, basic oxygen process vessels, rotating furnaces, and electric furnaces. The injection of non-gaseous fluidized fuel into admixture with the oxygen stream may be initiated at any stage of the treatment of the ferrous metal charge with oxygen.

What is claimed is:

1. In a process for the manufacture of steel which includes the step of refining a molten ferrous metal charge by top blowing it with at least one stream of oxygen, the improvement comprising introducing into said oxygen stream, continuously throughout said refining step, a non-gaseous fluidized fuel in an amount sufficient to suppress the formation of iron oxide fumes, said non-gaseous fluidized fuel comprising a solid fuel suspended in a liquid carrier.

2. In a process for the manufacture of steel which includes the step of refining a molten ferrous metal charge by top blowing it with at least one stream of oxygen, the improvement comprising introducing into said oxygen stream, continuously throughout said refining step, a non-gaseous fluidized fuel in an amount sufficient to suppress the formation of iron oxide fumes, said non-gaseous fluidized fuel containing a fine dispersion of slag-forming materials for injection into said ferrous metal charge.

References Cited

UNITED STATES PATENTS 3,406,026   10/1968   Limpach _____ 75—42
2,938,782   5/1960    Toulmin, Jr. _____ 75—42 X L. DEWAYNE RUTLEDGE, Primary Examiner
W. R. SATTERFIELD, Assistant Examiner U.S. Cl. X.R.

75—52, 54, 56, 57, 59